United States Patent [19]

Strepparola et al.

[11] Patent Number: 4,941,987

[45] Date of Patent: Jul. 17, 1990

[54] LUBRICATING GREASES

[75] Inventors: Ezio Strepparola, Treviglio; Mario Alfieri; Piero Gavezotti, both of Milan, all of Italy

[73] Assignee: Ausimont S.p.A., Milan, Italy

[21] Appl. No.: 292,010

[22] Filed: Dec. 30, 1988

[30] Foreign Application Priority Data

Dec. 30, 1987 [IT] Italy ................................ 23264 A/87

[51] Int. Cl.$^5$ .......................................... C10M 105/50
[52] U.S. Cl. ........................................................ 252/58
[58] Field of Search .............................. 252/68, 58, 54

[56] References Cited

U.S. PATENT DOCUMENTS

| | | | |
|---|---|---|---|
| 4,178,465 | 12/1979 | Caporiccio | 252/52 A X |
| 4,472,290 | 9/1984 | Caporiccio | 252/58 |
| 4,803,005 | 2/1989 | Juhlke | 252/58 |

*Primary Examiner*—William R. Dixon, Jr.
*Assistant Examiner*—James M. Hunter, Jr.
*Attorney, Agent, or Firm*—Stevens, Davis, Miller & Mosher

[57] ABSTRACT

New lubricating greases, the oily component of which is perfluoropolyether or fluoropolyether derivative of formula R—O—Q—CFX—(Y)$_n$—Z, having a number average molecular weight ranging from 1,500 to 10,000. wherein R is perfluoroalkyl radical R$_F$ or Z(Y)$_n$)—CFX;

Q is perfluoroalkylpolyether or fluoroalkylpolyether chain;

X is F or CF$_3$;

Y is a linking divalent radical;

n is zero or 1; and

Z is a radical selected from —CH$_2$OH, —CH$_2$OR$^1$, —COOR$^2$, —CONR$^3$R$^4$ etc. . . . or from particular radicals containing heteroatoms or particular aromatic radicals.

18 Claims, No Drawings

LUBRICATING GREASES

DESCRIPTION OF THE INVENTION

The invention relates to new lubricating greases. More precisely, it relates to lubricating grease, the oily component of which consists or consists essentially of a perfluoropolyether or fluoropolyether derivative.

It is well known that lubricating greases are preparable by mixing a perfluoropolyether free from functional groups, as oily component, with a fine powder of polytetrafluoroethylene, as thickening agent. The greases so obtained exhibit excellent properties of viscostaticity as a function of temperature, a low vapor tension and good lubricating properties under limit condition (high loads and low speeds). Conversely, they exhibit poor lubricating properties under hydrodynamic conditions and, in particular, when they are utilized in mechanisms running at high speeds. On the other hand, they do not impart a high corrosion resistance to the metal surfaces onto which they are applied.

Thus, it is an object of the present invention to provide new lubricating grease based on perfluoropolyether or fluoropolyether derivatives, which are capable of excellent performances in those applications where the parts to be lubricated run at high speeds, though retaining the good performances of the greases based on non-functional perfluoropolyethers as regards the viscostaticity as a function of the temperature, the vapor tension and the lubricating properties under limit conditions.

Another object is to provide new lubricating greases which are suited to impart a high corrosion resistance to the metal surfaces onto which they are applied.

A still further object is to provide new oils based on perfluoropolyether or fluoropolyether derivatives, which may be utilized as oily components also in combination with thickening agents other than polytetrafluoroethylene.

These and still other objects are achieved by the new lubricating grease of the present invention.

SUMMARY OF THE INVENTION

The greases of the present invention are characterized in that they contain a thickening agent and a perfluoropolyether or fluoropolyether derivative of formula R—O—Q—CFX—(Y)$_n$—Z having a number average molecular weight ranging from 1,500 to 10,000, in which:

R is a perfluoroalkyl radical R$_F$ containing from 1 to 3 carbon atoms or it is Z—(Y)$_n$—CFX;

Q is a perfluoroalkylpolyether or fluoroalkylpolyether chain;

X is F or CF$_3$;

Y is a linking divalent radical;

n is zero or 1; and

Z is a radical Z$_o$ selected from the group consisting of —CH$_2$OH, —CH$_2$OR$^1$, —COOR$^2$, —CONR$^3$R$^4$, —CN, —CH$_2$NH$_2$, —CH$_2$NHR$^5$, —CH$_2$NR$^6$R$^7$, —CHOH—CH$_2$OH or —COR$^8$, wherein R$^1$, R$^2$, R$^3$, R$^4$, R$^5$, R$^6$, R$^7$ and R$^8$, either alike or different from one another, are an alkyl group containing 1 to 8 carbon atoms, an aromatic group containing 6 or 10 carbon atoms or an alkylaromatic group containing 7 to 11 carbon atoms, in which the aromatic ring or rings may bear alkyl or polyethoxy substituent groups.

As an alternative, Z is an organic group Z$_1$ selected from:

(a) the non-aromatic, non-fluorinated radicals containing two or more heteroatoms, alike or different from one another, selected from O, N, S, Se, and P and located in position 1-3, 1-4 or 1-5 with respect to each other, and (b) the aromatic radicals containing or not containing one or more heteroatoms, alike or different from one another, selected from O, N, S, Se and P, such radicals being capable of giving rise to coordinate bonds or to charge transfer bonds.

Said non-aromatic or aromatic radicals Z$_1$ may bear one or more substituent groups NO$_2$, CN, R$^9$, or OR$^9$, in which R$^9$ is an alkyl radical containing 1 to 3 carbon atoms.

DETAILED DESCRIPTION OF THE INVENTION

The thickening agents of the present invention are generally selected from the group consisting of silica, clay earths, graphite, zinc oxide, polytetrafluoroethylene, polyureas, polyethylene, polypropylene, polyamides, polyimides, organic pigments, and soaps.

Some examples of suitable clay earths are bentonites and hectorites, Silica, clay earths, and graphite are optionally caused to become organophilic by using known techniques. As organic pigments it is possible to use, for example, phthalocyanines.

Preferably, the thickening agent is polytetrafluoroethylene.

Perfluoroalkylpolyether or fluoroalkylpolyether chain Q is generally composed of oxaperfluoroalkylene or oxafluoroalkylene units of the following types:

(I) (CF$_2$—CF$_2$O) and (CF$_2$O), such units being statistically distributed along the perfluoropolyethereal chain; or (II)

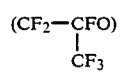

and (CFXO), wherein X is F or CF$_3$, such units being statistically distributed along the chain; or (III) (CF$_2$—CF$_2$O),

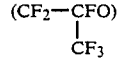

and (CFXO), wherein X is F or CF$_3$, such units being statistically distributed along the chain; or (IV)

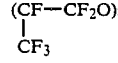

or (V) (CF$_2$—CF$_2$—CF$_2$O); or (VI)

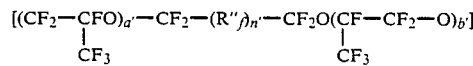

wherein R''$_f$ is a fluoroalkylene group; n' is zero or 1; a' and b' are integers, while the sum (a'+b') is equal to or higher than 2; or (VII) (CF$_2$—CF$_2$O); or (VIII)

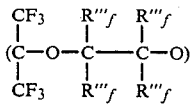

wherein groups R'''$_f$, alike or different from one another, are a fluorine atom or a perfluoroalkyl group; or (IX) (CF$_2$O—CF$_2$—CF$_2$O); or (X) (CH$_2$—CF$_2$—CF$_2$O); or (XI) [(CF$_2$—CF$_2$—CH$_2$O)$_{p'}$—R$^{iv}_f$—O—(CH$_2$—CF$_2$—CF$_2$O)$_{q'}$] wherein R$^{iv}_f$ is a fluoroalkylene group and p' and q' are integers or zero, the sum of which being equal to or greater than 2.

The linking divalent radical Y is preferably selected from the group consisting of: —CH$_2$O—, —CH$_2$—O—CH$_2$—, —CH$_2$—(OCH$_2$—CH$_2$)$_m$ wherein m ranges from 1 to 3, —CF$_2$—, —CF$_2$O—, —CH$_2$—, —CH$_2$—CH$_2$—, —COS—, —CO— and —CH$_2$S—.

Other suitable linking divalent radicals Y are described in U.S. Pat. No. 4,094,911, the content of which is incorporated herein by reference. The most preferred Y radicals are —CH$_2$O—, —CH$_2$—O—CH$_2$—, —CF$_2$—, —CH$_2$— and —CO—.

Group —CFX—(Y)$_n$—, in which n is zero or 1, permits one to introduce radical Z on the perfluoropolyether molecule. When radical Y is present, it may also exert an influence on the chemical properties of radical Z.

The perfluoropolyether or fluoropolyether derivatives R—O—Q—CFX—(Y)$_n$—Z, which, for the sake of brevity, will be hereinafter referred to as functional derivatives of perfluoropolyethers or fluoropolyethers, are per se known compounds.

They may be prevailingly bifunctional, i.e., of the type Z—(Y)$_n$—CFX—Q—CFX—(Y)$_n$—Z, or prevailingly monofunctional, i.e., of the type R$_F$—Q—CFX—(Y)$_n$—Z.

The term "prevailingly" is used because the monofunctional product, owing to its preparation method, is not obtained at 100% purity, but is mixed with variable amounts of non-functional product and bifunctional product.

Analogously, the bifunctional product is not obtained at 100% purity, but is mixed with variable amounts of monofunctional product.

Usually, the products having their chain consisting of oxaperfluoroalkylene units II and IV are monofunctional, while those having their chains consisting of oxaperfluoroalkylene or oxafluoroalkylene units I, III, VI and XI are bifuncational. Finally, the products having their chains consisting of oxaperfluoroalkylene or oxafluoroalkylene units V, VII, VIII and X may usually be either monofunctional or bifunctional.

Among the functionalized perfluoropolyethers and fluoropolyethers which are suitable for forming the greases conforming to the present invention, there may be cited, for example, those belonging to the following classes:

(A)

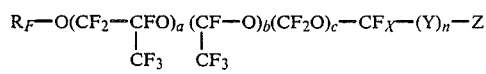

wherein R$_F$ is a perfluoroalkyl group containing 1 to 3 carbon atoms;
units

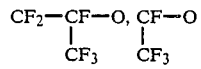

and CF$_2$O are statistically distributed along the chain;

a, b and c are integers and the ratio a/b+c varies from 5 to 15;

(B) Z—(Y)$_n$—CF$_2$—O—(C$_2$F$_4$O)$_d$ (CF$_2$O)$_e$—CF$_2$—(Y)$_n$—Z wherein units C$_2$F$_4$O and CF$_2$O are statistically distributed along the chain;

d and e are integers and the ratio d/e varies from 0.3 to 5;

(C)

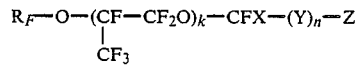

wherein R$_F$ is a perfluoroalkyl group containing 1 to 3 carbon atoms and k is an integer (D)

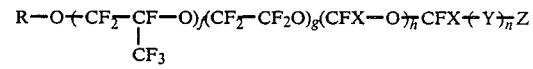

wherein R is R$_F$ (a perfluoroalkyl radical containing 1 to 3 carbon atoms) or Z—(Y)$_n$—CFX; units

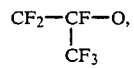

CF$_2$CF$_2$O and CFXO are statistically distributed along the chain; f, g and h are integers; the ratio f/g+h ranges from 1 to 10 and the ratio g/h ranges from 1 to 10;

(E)

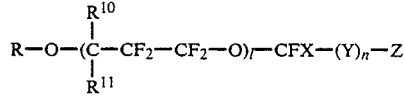

in which R is R$_F$ (a perfluoroalkyl radical containing from 1 to 3 carbon atoms) or Z—(Y)$_n$—CFX—; 1 is an integer and R$^{10}$ and R$^{11}$, alike or different from each other, are selected from H, Cl and F; a fluorine atom of the radicals —CF$_2$— may be substituted by H, Cl, a perfluoroalkoxy group (preferably containing from 1 to 12 carbon atoms) or a perfluoroalkyl group (preferably containing from 1 to 4 carbon atoms). When the compound contains different units

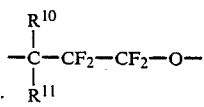
 5 these units are statistically distributed along the chain.

As already mentioned herein, functional groups $Z_o$ may carry radicals $R^1$, $R^2$, $R^3$, $R^4$, $R^5$, $R^6$, $R^7$ and $R^8$. When the aromatic ring or rings of these radicals carry alkyl groups, these groups preferably contain from 1 to 3 carbon atoms; when they carry polyethoxy groups, these groups preferably contain from 1 to 6 ethoxy units.

The most preferred $Z_o$ groups are —CH$_2$OH, —CONR$^3$R$^4$, —CH$_2$—NR$^6$R$^7$, and —CHOH—CH$_2$OH.

Functional groups $Z_1$, either non-aromatic or aromatic, are described in detail in European patent applications Nos. 165,649 and 165,650, the contents of which are incorporated herein by reference. The non-aromatic radical preferably contains from 2 to 3 heteroatoms.

When the aromatic radical contains heteroatoms, it contains preferably 1 to 2 heteroatoms.

Particularly suitable radicals $Z_1$ are the following;

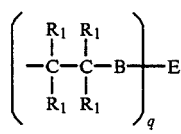 (1)

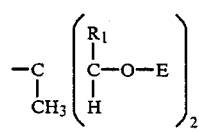 (2)

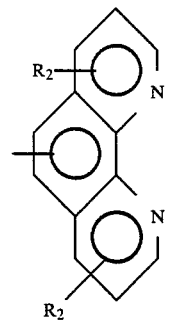 (3)

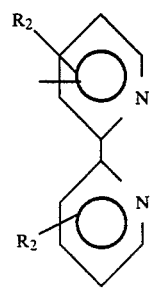 (4)

-continued

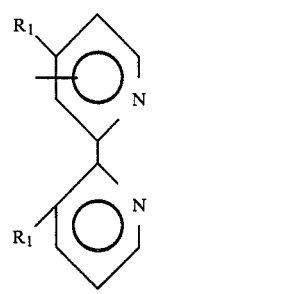 (5)

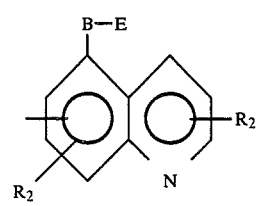 (6)

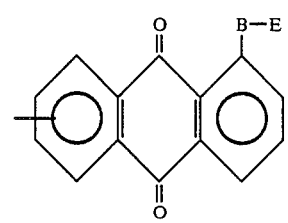 (7)

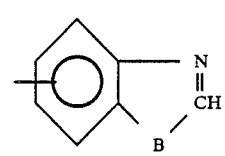 (8)

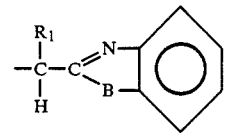 (9)

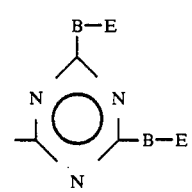 (10)

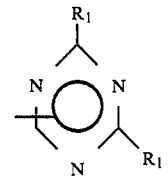 (11)

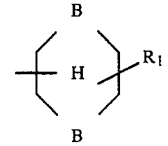 (12)

-continued

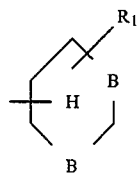 (13)

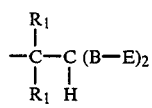 (14)

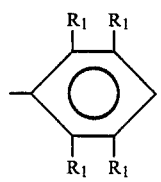 (15)

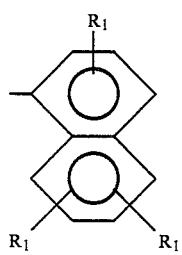 (16)

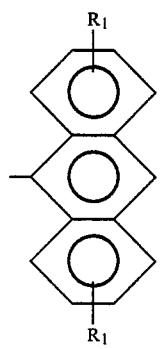 (17)

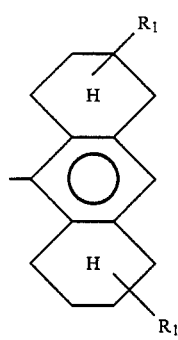 (18)

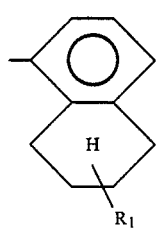 (19)

-continued

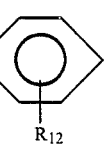 (20)

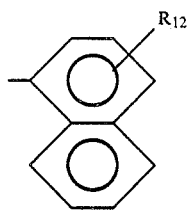 (21)

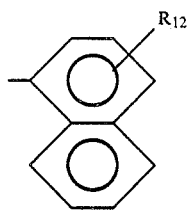 (22)

wherein:
B = An atom of oxygen or of sulphur
E = an alkyl containing from 1 to 3 carbon atoms
$R_1$ = H or an alkyl containing from 1 to 3 carbon atoms
$R_2$ = Cl, Br, H or an alkoxy group of formula E—O—
$R_{12}$ = $NO_2$ or CN
q = an integer ranging from 1 to 6, and preferably from 1 to 3.

Other particularly suitable $Z_1$ radicals are the following:

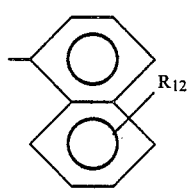 (23)

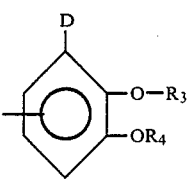 (24)

where:
$R_3$ and $R_4$, alike or different from each other, are alkyl radicals containing from 1 to 3 carbon atoms;
$R_5$ is a hydrogen atom or an alkyl radical containing from 1 to 3 carbon atoms;
D is a hydrogen atom or a radical $OR_5$ in which $R_5$ is the same as defined hereinabove;
G represents a group

or a group

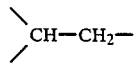

The preferred $Z_1$ radicals are those designated by numbers 1, 8, 9, 15, 16, 20, 21, 22 and 24.

The number average molecular weight of the functionalized perfluoropolyether or fluoropolyether preferably ranges from 1,800 to 5,000.

The grease conforming to the present invention usually contains from 60 to 90% by weight of functionalized perfluoropolyether or fluoropolyether.

Instead of only one functionalized perfluoropolyether or fluoropolyether, it is possible to use a mixture of two or more functionalized perfluoropolyethers or fluoropolyethers.

It is possible also to use a mixture of a functionalized perfluoropolyether or fluoropolyether with a non-functionalized perfluoropolyether or fluoropolyether having a number average molecular weight ranging from 1,500 to 10,000 and formula $R^1{}_F-O-Q-R^2{}_F$, where $R^1{}_F$ and $R^2{}_F$, alike or different from each other, are perfluoroalkyl radicals containing from 1 to 3 carbon atoms while Q is a perfluoroalkylpolyether or fluoroalkylpolyether chain either equal to or different from the chain of the functionalized perfluoropolyether or fluoropolyether.

In the non-functionalized perfluoropolyether or fluoropolyether, chain Q may be of any of the types defined above for the functionalized perfluoropolyethers and fluoropolyethers.

When using a mixture of the two types of perfluoropolyethers or fluoropolyethers, the grease according to the present invention usually contains from 30 to 45% by weight of functionalized oil and from 30 to 45% by weight of non-functionalized oil, the total amount of oil ranging from 60 to 90% by weight.

The perfluoropolyethers and the fluoropolyethers, either functionalized or non-functionalized, are per se known compounds described for example in U.S. Pat. Nos. 3,242,218, 3,655,041, 3,715,378, 3,810,874, 3,847,978 and 4,523,039, in Italian patent No. 903,446, in European patent applications Nos. 148,492, 151,877, 165,649, 165,650, 224,201 and in international patent applications Nos. WO 87/00538 and WO 87/02992.

For preparing the greases starting from the perfluoropolyether or fluoropolyether oils and from the thickening agents use is made of known techniques, which are based on processes suitable for optimizing the interpenetration of the mixture of the components, by means of mixing techniques under vacuum or by the use of volatile substances which wet and suspend the thickening agent.

When polytetrafluoroethylene is used as a thickening agent, the method described in U.S. Pat. No. 4,472,290 may be followed.

It is possible to start from polytetrafluoroethylene either in powder form of in suspenion in a chlorofluorocarbon solvent.

When starting from powder, the powder is first subjected to degassing. This step occurs for example at temperatures ranging from 20° to 60° C., and preferably at about 50° C.

A vacuum generally ranging from $10^{-3}$ to 10 torr is applied for a time usually varying from 1 to 5 hours, and preferably for a time of about 2 hours.

The perfluoropolyether or fluoropolyether oil is separately degassed by following the same procedures. Then the powder is caused to be imbibed by the oil. This step generally occurs at temperatures ranging from 20° to 60° C., and preferably at about 30° C. It is carried out under a vacuum generally ranging from $10^{-3}$ to 10 torr for a period of time generally ranging from 8 to 12 hours.

The subsequent step is kneading, which is carried out in a kneading machine, at temperatures usually ranging from 20° to 60° C., and preferably at room temperature. The kneading is carried out under a vacuum generally ranging from $10^{-3}$ to 10 torr for a time usually ranging from 6 to 10 hours. An apparatus which is suitable to carry out this step, is, for example, a conventional rotary arm kneading machine.

Subsequently, the grease is subjected to homogenization, which is carried out, for example, in a 3-cylinder grinder or in a compressor of the Maunton Goulin type. This homogenizing step is usually conducted at atmospheric pressure, at a temperature ranging from 20° to 60° C., and preferably at room temperature. If the polytetrafluoroethylene particles are too large, they are ground in the course of this step.

When a polytetrafluoroethylene suspension is utilized, the chlorofluorocarbon in which the polymer is dispersed is for example 1,1,2-trichloro-1,2,2-trifluoroethane.

The concentration of the polymer in the suspension ranges, for example, from 5 to 10% by weight.

In this case, only the oil is degassed according to the procedures indicated hereinbefore. The mixture is then directly kneaded at a temperature which is sufficiently high as to permit a complete evaporation of the solvent, optionally operating under vacuum. The oil is made to drop slowly while the solvent evaporates, while continuing the mixing for a period of time generally ranging from 8 to 10 hours.

A homogenization conducted according go the above-indicated procedures follows:

The size of the polytetrafluoroethylene particles in the grease is generally below 20 microns, preferably below 10 microns.

The greases according to the present invention exhibit good antistick and slip characteristics, which are due to the lower ratio between the static and the dynamic coefficients of friction, and they therefore reduce the vibratory motions in the high-speed applications. Therefore, they are particularly suitable for said applications, e.g., for lubrication on ball bearings or on cylindrical roller bearings rotating at 10,000–20,000 rpm with low radial loads (for example 25 kg), where they permit running periods of at least 500 hours.

Furthermore, they impart a good corrosion resistance to the metal surface onto which they are applied.

The lubricating film exhibits also an excellent tightness (continuity).

All these properties were not achieved by the greases based on polytetrafluoroethylene and non-functionalized perfluoropolyethers. Always in comparison with the non-functionalized perfluoropolyether oils, a further advantage resides in that the functionalized perfluoropolyether and fluoropolyether oils may be used with thickening agents other than polytetrafluoroethylene.

The following examples are given to illustrate but not to limit the present invention.

EXAMPLE 1

The functionalized perfluoropolyether oil had the formula:

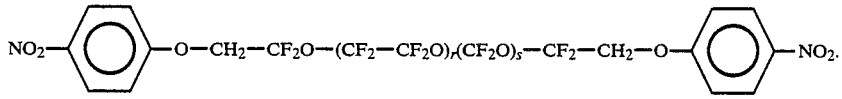

The r/s ratio was equal to 0.8. The number average molecular weight was equal to 4,770.

This oil was prepared starting from:

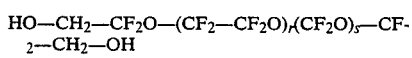

by reaction with NaH and subsequently with

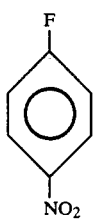

The thickening agent was polytetrafluoroethylene in powder form having an average diameter of agglomerates equal to 10 microns.

The oil (193 g) and the thickening agent (107 g) were separately degreased for 60 minutes under vacuum (5 mm Hg) at 60° C. The imbibition of the thickening agent was carried out in 12 hours under vacuum (5 mm Hg). Mixing then occurred in a rotary arm kneading machine, kneading being carried out during 8 hours under vacuum (5 mm Hg), after which the product was homogenized in a 3-cylinder grinder.

The grease obtained, not subjected to further treatment, exhibited a penetration of 280 mm/10 according to test ASTM D217, corresponding to a NLGI (National Lubricating Grease Institute) degree equal to 2.

Its oil loss at 240° C. during 30 hours, according to standard FTMS 791-321, was equal to 8%.

The corrosion strength measured by the Emkor test (DIN 51802) was $\frac{1}{1}$.

Typically, the greases based on non-functionalized perfluoropolyethers and on polytetrafluoropolyethylene give, conversely, a result of 5/5 when subjected to the Emkor test.

The grease conforming to the present invention was compared, in a high speed application, with a grease prepared starting from polytetrafluoroethylene and a non-functionalized perfluoropolyether of formula:

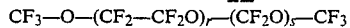

having an r/s ratio equal to 0.8 and a number average molecular weight of 10,000.

The latter grease was prepared by using the same amounts of oil and thickening agent and according to the same procedures as for the grease of the present invention.

The comparison was made on two SKF ball bearings having an outside diameter of 72 mm and rotating at 15,000 rpm with an applied radial load of 25 kg. The bearing lubricated with the grease prepared from a non-functionalized perfluoropolyether seized up after a 48-hour operation; the bearing lubricated with the grease of the present invention went on running for three weeks (i.e., until the stop of the test).

EXAMPLE 2

Operating as in Example 1, 240 g of the same oil of Example 1 were mixed with 106 g of PTFE in powder (average diameter of the agglomerates: 10 microns).

Obtained in this way was a grease which exhibited a penetration of 320 mm/10 (NLGI degree=1) and ana oil loss at 204° C./30 h=10%.

EXAMPLE 3

The functionalized perfluoropolyether oil had the formula:

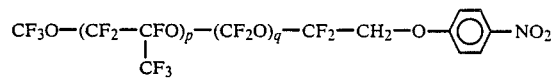

The p/q ratio was equal to 10. The number average molecular weight was equal to 1,910.

This compound was prepared starting from:

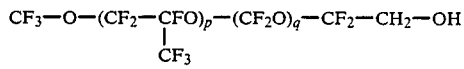

in the same way as the compound of Example 1.

Following the procedures of Example 1, 190 g of this compound were mixed with 102 g of PTFE in powder form (average diameter of the agglomerates: 10 microns). Obtained thus was a grease having a NLGI consistency degree=2 and an oil loss at 204° C./30 h equal to 7.8%.

The Emkor test gave the following result: 1/1.

EXAMPLE 4

The functionalized perfluoropolyethereal oil had the formula:

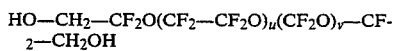
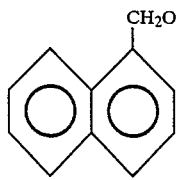 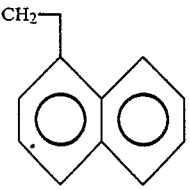

This oil was prepared starting from:

HO—CH$_2$—CF$_2$O(CF$_2$—CF$_2$O)$_u$(CF$_2$O)$_v$—CF$_2$—CH$_2$OH by etherification of the corresponding sodium alcholate with 1-naphthyl chloride.

Operating as in Example 1, 192 g of oil were mixed with 110 g of PTFE in powder form (average diameter of the agglomerates: 10 microns).

Obtained in this way was a grease, which, not subjected to further processing exhibits a penetration of 283 mm/10 (NLGI degree=2) and an oil loss at 204° C./30 h of 8.2%.

The Emkor test gave the following result: 2/2.

EXAMPLE 5

Here were utilized the oil of Example 4 and a PTFE suspension at 7.5% by weight in 1,1,2-trichloro-1,2,2,-trifluoroethane. The average diameter of the PTFE particle agglomerates was ≦5 microns.

In a kneading machine there were mixed 200 g of oil, which had been previously degassed under vacuum (5 mm), with 470 g of PTFE suspension. It was heated at 60° C., allowing the solvent to evaporate and slowly adding the oil over about 2 hours under stirring.

Kneading was conducted for a total of 8 hours and the grease was homogenized in the 3-cylinder grinder.

The product exhibited a penetration, without further processing, of 280 mm/10 (NLGI consistency degree=2) and an oil loss at 204° C./30 h of 9%.

EXAMPLE 6

Here were used the functionalized perfluoropolyethereal oil of Example 4 and the PTFE suspension of Example 5.

Operating as in Example 4, 290 g of oil were mixed with 470 g of suspension.

The grease exhibited a penetration of 370 mm/10 (NLGI consistency degree=0).

EXAMPLE 7

The functionalized perfluoropolyether oil had the formula:

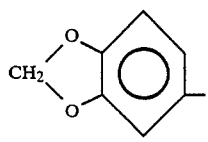—CH$_2$O—CH$_2$—CF$_2$O(CF$_2$CF$_2$O)$_g$(CF$_2$O)$_h$—CF$_2$—CH$_2$O—CH$_2$—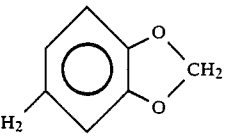

The g/h ratio was equal to 0.8. The number average molecular weight was of 2,450.

The oil was prepared by reacting the corresponding alcoholate with 3,4-methylene dioxybenzyl chloride.

The thickening agent was the PTFE in powder of Example 1. The procedure was as in Example 1 using the same quantities of oil and thickener as in Example 1.

A grease having a NLGI consistency degree equal to 2 was obtained.

The Emkor test gave the following result: 2/2.

EXAMPLE 8

The functionalized perfluoropolyether oil had the formula:

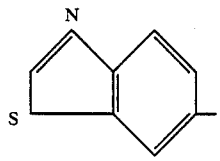—NH—CO—CF$_2$O(CF$_2$—CF$_2$O)$_g$(CF$_2$O)$_h$—CF$_2$—CO—NH—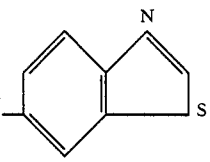

The g/h ratio was equal to 0.8. The number average molecular weight was equal to 2,450.

The oil was prepared by reacting:

C$_6$H$_5$—O—CO—CF$_2$O—(CF$_2$—CF$_2$O)$_g$(CF$_2$O)$_h$—CF$_2$—CO—O—C$_6$H$_5$ with

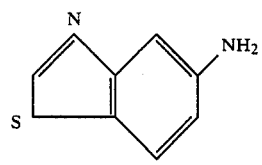

The thickening agent was the PTFE in powder form of Example 1.

The procedure was as in Example 1, using the same amounts of oil and of thickening agent as in Example 1.

The grease obtained has an NLGI degree of consistency equal to 2 and an oil loss at 204° C./30 h of 8%.

The Emkor test gave the following result: 0/0.

EXAMPLE 9

The functionalized perfluoropolyether oil had the formula:

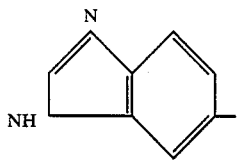 —NH—CO—CF$_2$O(CF$_2$—CF$_2$O)$_g$(CF$_2$O)$_h$—CF$_2$—CO—NH— 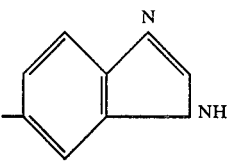

The g/h ratio was equal to 0.8. The number average molecular weight was of 2,450.

The oil was prepared by reacting

C$_6$H$_5$—O—CO—CF$_2$O—(CF$_2$—CF$_2$O)$_g$(CF$_2$O)$_h$—CF$_2$—CO—O—C$_6$H$_5$ with

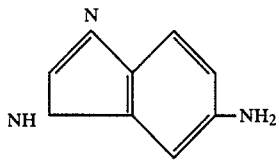

The thickening agent was the PTFE in powder of Example 1.

The procedure was as in Example 1, using the same amounts of oil and of thickening agent as in Example 1.

The grease obtained had an NLGI consistency degree=2 and an oil loss at 204° C./30 h of 8.3%.

The result obtained from the Emkor test was: 0/0.

EXAMPLE 10

The functionalized perfluoropolyether oil had the formula:

HOCH$_2$—CF$_2$O—(CF$_2$—CF$_2$O)$_g$(CF$_2$O)$_h$—CF$_2$—CH$_2$OH

The g/h ratio was equal to 0.8. The number average molecular weight was equal to 2,180.

The thickening agent was the PTFE in powder form of Example 1.

The procedure was as in Example 1, using the same amounts of oil and of thickening agent as in Example 1.

Obtained in this was a grease having an NLGI consistency degree equal to 2 and an oil loss at 204° C./30 h of 8%.

The Emkor test gave the following result: 0/0.

What is claimed is:

1. A lubricating grease comprising a thickening agent and a perfluoropolyether or fluoropolyether derivative of the formula R—O—Q—CFX—(Y)$_n$—Z, having a number average molecular weight ranging from 1,500 to 10,000, in which:
   R is a perfluoroalkyl radical containing 1 to 3 carbon atoms or it is the group Z—(Y)$_n$—CFX;
   Q is a perfluoroalkylpolyether or fluoroalkylpolyether chain;
   X is F or CF$_3$;
   Y is a linking divalent radical;
   n is zero or 1;
   Z is a radical selected from the group consisting of —CH$_2$OH, —CH$_2$OR$^1$, —COOR$^2$, —CONR$^3$R$^4$, —CN, —CH$_2$NH$_2$, —CH$_2$NHR$^5$, —CH$_2$NR$^6$R$^7$, —CHOH—CH$_2$OH and —COR$^8$,
   wherein
   R$^1$, R$^2$, R$^3$, R$^4$, R$^5$, R$^6$, R$^7$ and R$^8$, alike or different from one another, are an alkyl group containing 1 to 8 carbon atoms, an aromatic group containing 6 or 10 carbon atoms or an alkyl aromatic group containing 7 to 11 carbon atoms and in which the aromatic ring or rings are unsubstituted or substituted with alkyl or polyethoxy substituting groups, or Z is an organic group selected from the group consisting of non-aromatic and non-fluorinated radicals containing two or more heteroatoms, alike or different from one another, selected from the group consisting of O, N, S, Se and P and located in position 1-3, 1-4, or 1-5 to one another;
   said aromatic or non-aromatic radicals are unsubstituted or substituted with one or more substituting groups selected from the group consisting of NO$_2$, CN, R$^9$ or OR$^9$, wherein R$^9$ is an alkyl radical containing 1 to 3 carbon atoms.

2. A lubricating grease of claim 1, wherein the thickening agent is selected from the group consisting of silica, clay earths, graphite, zinc oxide, polytetrafluoroethylene, polyureas, polyethylene, polypropylene, polyamides, polyimides, organic pigments and soaps.

3. A lubricating grease of claim 2, wherein the thickening agent is polytetrafluoroethylene.

4. A lubricating grease according to claim 1, 2 or 3, wherein perfluoroalkylpolyether or fluoroalkylpolyether chain Q is selected from the group consisting of the chains having the following oxaperfluoroalkylene and oxafluoroalkylene units:
   (I) (CF$_2$CF$_2$O) and (CF$_2$O), such units being distributed along the perfluoropolyether chain;
   (II)

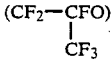

and (CFXO), wherein X is F or CF$_3$, such units being distributed along the chain;
   (III) (CF$_2$—CF$_2$O),

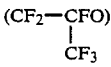

and (CFXO) wherein X is F or CF$_3$, such units being statistically distributed along the chain;
   (IV)

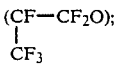

(V) (CF$_2$—CF$_2$—CF$_2$O);
(VI)

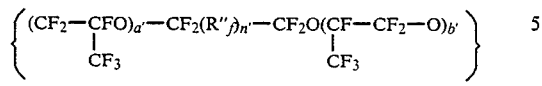

wherein R″$_f$ is a fluoroalkylene group; n′ is zero or 1; a′ and b′ are integers, while the sum (a′+b′) is equal to or higher than 2;
(VII) (CF$_2$—CF$_2$O);
(VIII)

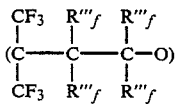

where groups R‴$_f$, alike or different from each other, are a fluorine atom or a perfluoroalkyl group;
(IX) (CF$_2$O—CF$_2$—CF$_2$O);
(X) (CH$_2$—CF$_2$—CF$_2$O); and
(XI) [(CF$_2$—CF$_2$—CH$_2$O)$_{p'}$—R$^{iv}$$_f$—O—(CH$_2$CF$_2$—CF$_2$O)$_{q'}$] wherein R$^{iv}$$_f$ is a fluoroalkylene group and p′ and q′ are integers or zero, the sum of which is higher than 2.

5. A lubricating grease according to claim 1, 2 or 3, wherein the linking divalent radical Y is selected from the group consisting of: —CH$_2$O—, —CH$_2$—O—CH$_2$—, CH$_2$—(OCH$_2$CH$_2$)$_m$— in which m ranges from 1 to 3, —CF$_2$—, —CF$_2$O—, —CH$_2$—, —CH$_2$—CH$_2$—, —COS—, —CO— and —CH$_2$S—.

6. A lubricating grease according to claim 1, 2 or 3, wherein the number average molecular weight of the perfluoropolyether or fluoropolyether derivative ranges from 1,800 to 5,000.

7. A lubricating grease according to claim 1, 2 or 3, wherein it contains from 60 to 90% by weight of perfluoropolyether or fluoropolyether derivative.

8. A lubricating grease according to claim 4, wherein it contains, in addition to the perfluoropolyether or fluoropolyether derivative, a nonfunctional perfluoropolyether or fluoropolyether, having a number average molecular weight ranging from 1,500 to 10,000, and having the formula R$^1$$_F$—O—Q—R$^2$$_F$, in which R$^1$$_F$ and R$^2$$_F$, alike or different from each other, are perfluoroalkyl radicals containing 1 to 3 carbon atoms and Q is as defined in claim 4.

9. A lubricating grease according to claim 8, wherein it contains from 30 to 45% by weight of perfluoropolyether or fluoropolyether derivative and from 30 to 45% by weight of non-functional perfluoropolyether or fluoropolyether, the total amount of the two components ranging from 60 to 90% by weight.

10. A lubricating grease comprising a thickening agent and a perfluoropolyether or fluoropolyether derivative of the formula R—O—Q—CFX—(Y)$_n$—Z, having a number average molecular weight ranging from 1,500 to 10,000, in which:
R is a perfluoroalkyl radical containing 1 to 3 carbon atoms or it is the group Z—(Y)$_n$—CFX;
Q is a perfluoroalkylpolyether or fluoroalkylpolyether chain;
X is F or CF$_3$;
Y is a linking divalent radical;

n is zero or 1;
Z is an organic group selected from the group consisting of aromatic radicals unsubstituted or substituted by one or more heteroatoms, either alike or different from one another, selected from the group consisting of O, N, S, Se and P, said aromatic radicals are unsubstituted or substituted with one or more substituting groups selected from the group consisting of NO$_2$, CN, R$^9$ or OR$^9$, wherein R$^9$ is an alkyl radical containing 1 to 3 carbon atoms.

11. A lubricating grease of claim 10, wherein the thickening agent is selected from the group consisting of silica, clay earths, graphite, zinc oxide, polytetrafluoroethylene, polyureas, polyethylene, polypropylene, polyamides, polyimides, organic pigments and soaps.

12. A lubricating grease of claim 10 wherein the thickening agent is polytetrafluoroethylene.

13. A lubricating grease according to claim 10 wherein perfluoroalkylpolyether or fluoroalkylpolyether chain Q is selected from the group consisting of the chains having the following oxaperfluoroalkylene and oxafluoroalkylene units:
(I) (CF$_2$CF$_2$O) and (CF$_2$O), such units being distributed along the perfluoropolyether chain;
(II)

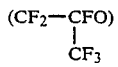

and (CFXO), wherein X is F or CF$_3$, such units being distributed along the chain;
(III) (CF$_2$—CF$_2$O),

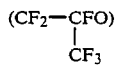

and (CFXO) wherein X is F or CF$_3$, such units being distributed along the chain; or
(IV)

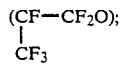

(V) (CF$_2$—CF$_2$—CF$_2$O);
(VI)

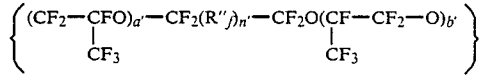

wherein R″$_f$ is a fluoroalkylene group; n′ is zero or 1; a′ and b′ are integers, while the sum (a′+b′) is equal to or higher than 2;
(VII) (CF$_2$—CF$_2$O);
(VIII)

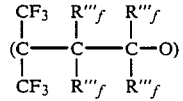

where groups R‴$_f$, alike or different from each other, are a fluorine atom or a perfluoroalkyl group;

(IX) $(CF_2O-CF_2-CF_2O)$;

(X) $(CH_2-CF_2-CF_2O)$; and (XI) $(CF_2-CF_2-CH_2O)_{p'}-R^{iv}{}_f-O-(CH_2CF_2-CF_2O)_{q'}$ wherein $R^{iv}{}_f$ is a fluoroalkylene group and p' and q' are integers or zero, the sum of which is higher than 2.

14. A lubricating grease according to claim 10 wherein the linking divalent radical Y is selected from the group consisting of: $-CH_2O-$, $-CH_2O-CH_2-$, $CH_2-(OCH_2CH_2)_m-$ in which m ranges from 1 to 3, $-CF_2-$, $-CF_2O-$, $-CH_2-$, $-CH_2-CH_2-$, $-COS-$, $-CO-$ and $-CH_2S-$.

15. A lubricating grease according to claim 10 wherein the number average molecular weight of the perfluoropolyether or fluoropolyether derivative ranges from 1,800 to 5,000.

16. A lubricating grease according to claim 10, wherein it contains from 60 to 90% by weight of perfluoropolyether or fluoropolyether derivative.

17. A lubricating grease according to claim 13 wherein it contains, in addition to the perfluoropolyether or fluoropolyether derivative, a non-functional perfluoropolyether or fluoropolyether, having a number average molecular weight ranging from 1,500 to 10,000, and having the formula $R^1{}_F-O-Q-R^2{}_F$, in which $R^1{}_F$ and $R^2{}_F$, alike or different from each other, are perfluoroalkyl radicals containing 1 to 3 carbon atoms and Q is as defined in claim 13.

18. A lubricating grease according to claim 17, wherein it contains from 30 to 45% by weight of perfluoropolyether or fluoropolyether derivatives and from 30 to 45% by weight of non-functional perfluoropolyether or fluoropolyether, the total amount of the two components ranging from 60 to 90% by weight.

* * * * *